United States Patent Office

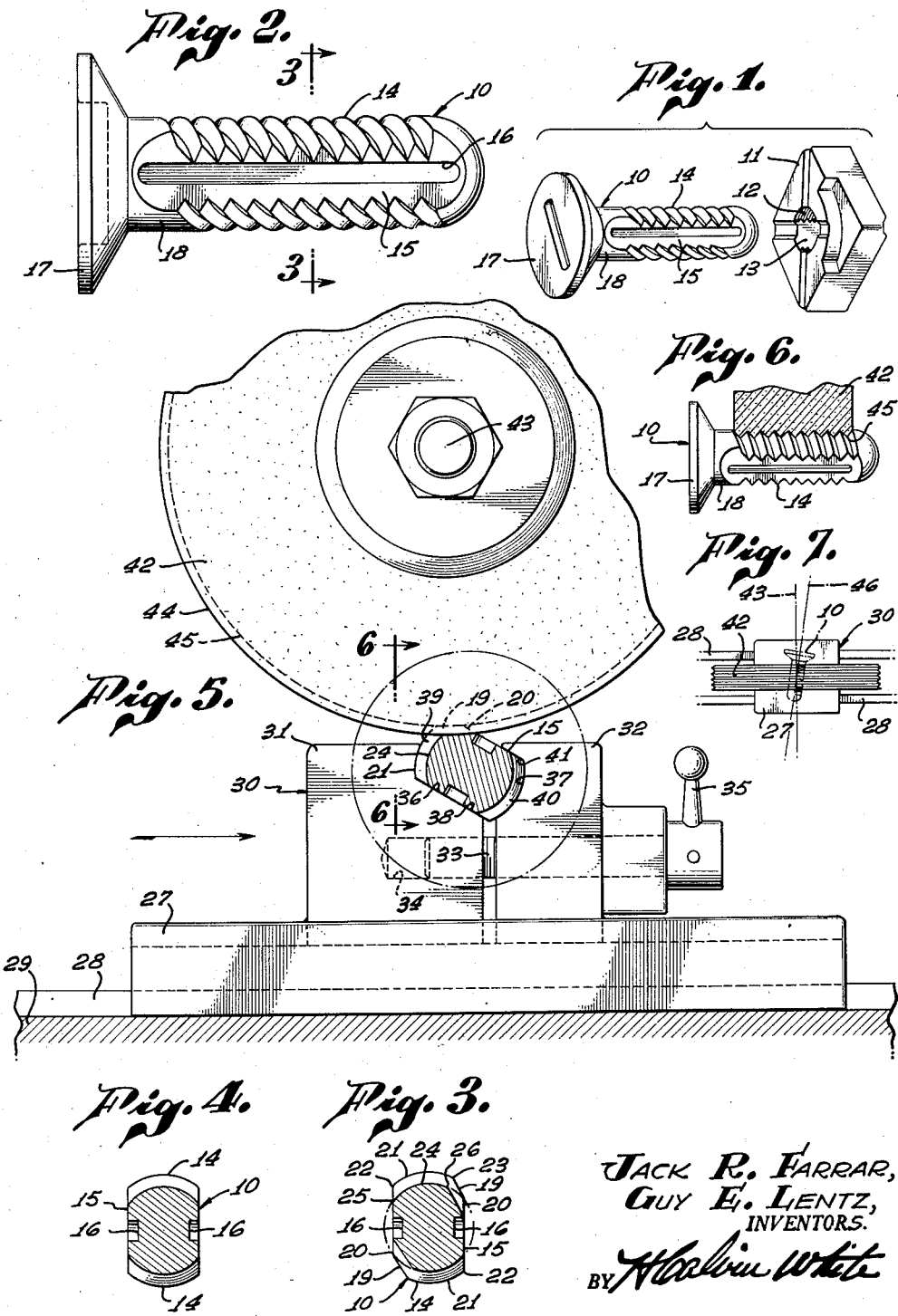

2,838,775
Patented June 17, 1958

2,838,775

FORMATION OF FASTENER ELEMENTS HAVING INTERRUPTED THREADS

Jack R. Farrar, Whittier, and Guy E. Lentz, Burbank, Calif., assignors to Frank A. Pachmayr, Los Angeles, Calif.

Application January 21, 1954, Serial No. 405,338

5 Claims. (Cl. 10—27)

This invention relates to improved methods and apparatus for forming quick disconnect threaded elements, i. e. screws or nuts of a type having interrupted or only partially circular threads.

A very effective type of quick disconnect fastener is that in which an interengageable screw and nut are provided with only partially circular threads, which are adapted to be moved into and out of holding or meshing engagement by a rather small rotation of the screw relative to the nut. In such a fastener, it is desirable in order to assure proper engagement of the screw and nut threads, that the leading portions of either the screw or nut threads, preferably the former, be given a camming configuration for camming the engaging threads into proper meshing relation as they are rotated into engagement. More specifically, the leading portions of the threads of one of the parts may be of a progressively decreasing or reduced radius to provide for the desired camming action.

The general object of the present invention is to provide a practical and effective method and apparatus for forming a screw or nut, usually the former, having interrupted threads with such camming portions. In accordance with the invention, such formation of the threaded element is achieved by forming the main constant diameter portions of the threads and the leading portions thereof in two separate operations. Preferably, we first form on the element a series of interrupted threads which are of constant radius along their entire circular extents, and we then remove portions of those threads at their leading ends in a manner shaping the leading ends of the threads to be of progressively decreasing radius. This shaping of the leading ends of the threads may be effected by a grinding operation, preferably with a grinding wheel having a face which is shaped in conformity to a plurality of successive threads on the threaded element. During the grinding operation, the threaded element may be releasably held in a suitable fixture mounted to a tool carriage, which is advanced past the grinder in a manner cutting off and shaping the leading ends of the threads.

Where the threaded element is a screw, the threads may be circularly continuous when first formed on the screw, and then subsequently be interrupted by removing portions of the screw along a pair of opposite sides thereof. Preferably, the threads are first formed by rolling them onto a screw blank.

The above and other features and objects of the present invention will be better understood from the following detailed description of the typical embodiment illustrated in the accompanying drawing, in which:

Fig. 1 is a perspective view of a partially threaded screw element made in accordance with the invention, and shown with a partially threaded nut element engageable with the screw;

Fig. 2 is an enlarged side view of the screw element of Fig. 1;

Fig. 3 is a transverse section through the screw taken on line 3—3 of Fig. 2;

Fig. 4 is a sectional view corresponding to Fig. 3, but showing the screw before the leading cam portions of the threads have been formed; and Fig. 5 is a fragmentary side view of a grinding machine for forming the leading cam portions of the thread on the Fig. 2 screw.

Referring first to Fig. 1, I have shown at 10 a screw formed in accordance with the present invention, together with a nut 11 connectable to the screw. The nut has two diametrically opposed series of partial or interrupted threads extending only partially about the circular extent of the screw receiving opening in the nut. Circularly between the two series of threads 12, the screw receiving opening in the nut has a pair of diametrically opposed enlarged diameter portions 13.

Screw 10 has a head portion 17 and an axially projecting reduced diameter stem portion 18. Along stem 18, the screw has two diametrically opposed series of partial or interrupted threads 14, circularly between which the screw has two parallel oppositely facing axially extending flat faces 15. A pair of elongated grooves 16 may be formed in the opposite sides of screw 10 along the centers of the two flat or planar surfaces 15.

The helical threads 12 of nut 11 are formed at a constant or unchanging diameter along their entire extents angularly about the axis of the screw and nut. The helically extending threads 14 of the screw, however, have circularly leading portions 19 which progressively decrease in diameter toward their leading ends 20, to act as camming means for camming the screw axially relative to the nut to a position for proper meshing when the screw is rotated into holding engagement with the nut. Except at the locations of their camming portions 19, threads 14 of screw 10 extend at a constant radius from the longitudinal axis of the screw. That is, the crests 21 of screw threads 14 extend at a constant diameter between points 22 and 23 in Fig. 3, while the roots 24 of threads 14 extend at a constant and predetermined smaller diameter between points 25 and 26. Circularly beyond points 23 and 26, both the crests and roots of the threads progressively decrease in diameter toward the leading ends 20 of the threads and in parallel relation. Preferably, the leading ends 20 of the threads are spaced closer to the screw axis a distance corresponding to the radial extent of the threads themselves, that is, the radial distance between roots 24 and crests 21, so that the leading ends 20 of the thread crests are at the same diameter as the main portions 24 of the thread roots (see broken line in Fig. 3). It is also found desirable that the constant diameter portions of screw threads 14 extend along the major portion of the circular extents of threads 14.

In formation of the screw of Figs. 1 to 3, the stem 18 may first be formed of a cylindrical configuration, following which conventional circularly continuous helical threads may be formed entirely about the cylindrical stem. These threads extending about the screw stem may be of constant or unchanging radius corresponding to the radius of the main constant radius portions of the interrupted threads to be formed. Preferably, the threads extending entirely about the screw are formed by a conventional thread rolling process, according to which thread shaped rollers are forced against the screw stem as it turns to deform the stem material to a thread shaped configuration. After the threads have thus been formed on the stem, the screw may be milled or otherwise cut away at its opposite sides to form the flats 15 and grooves 16. After being brought to the condition of Fig. 4, screw 10 is placed in the apparatus illustrated fragmentarily in Fig. 5, to grind the leading edge portions 19 on the threads. This apparatus includes a conventional grinding machine, which has been shown only in part in order to avoid unnecessarily complicating the drawing. The grinding machine comprises the usual horizontally movable carriage 27, which is slidably movable along horizontal tracks 28 formed on a supporting bed 29. The machine includes the usual power operated means for mechanically reciprocating carriage 27 along tracks 28. Mounted on carriage 27 is a vice or screw holding unit 30, including a first jaw 31 rigidly attached to carriage 27, and a second jaw 32 which is movable horizontally toward and away from jaw 31. A screw 33 rotatably carried by jaw 32 is threadedly connected into a bore 34 in jaw 31, and is adapted to be rotated by a handle 35 to actuate jaw 32 toward and away from jaw 31.

The two jaws 31 and 32 have opposed horizontally elongated recesses 36 and 37, which are shaped in correspondence with screw 10 as seen in Fig. 4, and act to positively grip the screw and hold it in a position in which its axis extends horizontally and generally transversely of the direction of movement of carriage 27. The formation of recesses 36 and 37 is such as to hold screw 10 with its flat sides 15 extending at an inclination to the horizontal, so that the leading portions 19 of one of the sets of threads on the screw project upwardly above vice 30. More specifically, the recess 36 in jaw 31 may have a first inclined planar portion 38 for engaging one of the flat sides 15 of the screw, and may have a second upper portion presenting a series of thread-like portions 39 shaped in correspondence with the engaged threads 14 of the screw, to positively mesh with and accurately position the screw. Similarly, recess 37 in jaw 32 may have a threaded portion 40 and a flat portion 41 for engaging and positioning the screw.

Above the path of horizontal movement of carriage 27 and its carried screw 10, the grinding machine includes a motor driven rotary grinding wheel 42 which turns about an axis 43 extending horizontally and directly transversely of the path of movement of carriage 27, and which therefore extends generally but not exactly parallel to the axis of a screw 10 held by vice 30. The outer annular face 44 of grinding wheel 42 is crush ground to the ridged transverse configuration illustrated in Fig. 6. More specifically, the outer surface 44 of grinding wheel 42 has a series of annular projections 45 having the sectional configuration of the threads 14 formed on screw 10. The positioning of grinding wheel 42 is such that the projections 45 of the grinding wheel are alined longitudinally of the path of movement of carriage 27 with the portions of the threads 14 on a vice held screw 10 which are engaged by the grinding wheel as carriage 27 is moved horizontally along tracks 28 and beneath the grinding wheel. The vertical positioning of the grinding wheel is such as to cause the projections 45 of the wheel to grind away the leading portions 19 of the screw threads, and form them of the progressively decreasing camming configuration illustrated in Fig. 3. That is, the grinding wheel is positioned to take a sufficiently deep cut in the screw to assure that the leading ends 20 of the camming portions 19 of the threads have a maximum diameter not greater than the normal root diameter 24.

In order that the grinding ridges 45 of wheel 42 may be alined with threads 14 of the screw during a grinding operation, vice jaws 31 and 32 are so constructed as to hold the screw 10, though exactly horizontally, at a small angle to the axis 43 of the grinding wheel. This angularity corresponds to the pitch angle of the threads 14 on the screw, and is illustrated diagrammatically in Fig. 7, which may be considered as looking downwardly on the grinder and screw from about the grinding wheel. In this view, it is noted that the axis 43 of grinding wheel 42 extends directly transversely to tracks 28, while axis 46 of screw 10 held by vice 30 extends at an oblique angle to both the grinder axis and tracks 28. The angularity of screw 10 is of course such that the grinder engaged portions of threads 14 on the screw lie essentially in planes extending parallel to tracks 28 and transversely of axis 43.

After a screw has been formed in the above described manner, it may be inserted into a nut such as that shown at 11 in Fig. 1, and then rotated relative to the nut to bring the screw and nut threads into holding engagement. During such rotation, the leading portions 19 of the screw threads are the first portions of those threads to engage the nut threads. These leading portions 19 of the screw threads then act as camming elements to cam the screw axially during its initial stages of rotation into a proper position for correct intermeshing of the main portions of the screw threads with the nut threads.

We claim:

1. The method of making a quick disconnect screw that comprises providing on said screw a series of interrupted threads extending only partially about the screw and of constant radius, and then in a separate operation removing some of the material of said screw at leading ends of said threads by engagement of the screw with a material removing tool having a material removing projection of essentially thread shaped sectional configuration, and moving said tool relative to the engaged screw along a path extending generally in the same direction as the threads at said ends thereof but progressively advancing radially with respect to the screw axis, to thereby form leading cam portions on the threads of progressively decreasing radius both at their crests and their roots.

2. The method as recited in claim 1 in which said first step of providing said interrupted threads comprises first providing helical threads on said screw extending entirely thereabout and of constant radius, and then removing material along opposite sides of said screw to form said interrupted threads extending only partially about the screw.

3. The method of making a quick disconnect screw that comprises providing on said screw a series of interrupted threads extending only partially about the screw and of constant radius, and then in a separate operation removing some of the material of said screw at leading ends of said threads by engagement of the screw with a grinding tool having a projection of essentially thread shaped sectional configuration, and moving said grinding tool relative to the engaged screw along a path extending generally in the same direction as the threads at said ends thereof but progressively advancing radially with respect to the screw axis, to thereby form leading cam portions on the threads of progressively decreasing radius both at their crests and their roots.

4. The method of making a quick disconnect screw that comprises providing on said screw a series of interrupted threads extending only partially about the screw and of constant radius, and then in a separate operation removing some of the material of said screw at leading ends of said threads by engaging the screw with a material removing tool having a plurality of material removing projections of essentially thread shaped sectional configuration and moving said tool relative to the engaged screw along a path extending generally in the same direction as the threads at said ends thereof but progressively advancing radially with respect to the screw axis, to thereby simultaneously form on a plurality of said threads leading cam portions thereof of progressively decreasing radius both at their crests and their roots.

5. The method of making a quick disconnect screw that comprises providing on said screw a series of interrupted threads extending only partially about the screw and of constant radius, and then in a separate operation removing some of the material of said screw at leading ends of said threads by engagement of said screw with a grinding tool having a plurality of grinding projections of essentially thread shaped sectional configuration, and moving said tool relative to the engaged screw along a path extending generally in the same direction as the threads at said ends thereof but progressively advancing radially with respect to the screw axis, to thereby simultaneously form on a plurality of said threads leading cam portions thereof of progressively decreasing radius both at their crests and their roots.

References Cited in the file of this patent

UNITED STATES PATENTS

| | | |
|---|---|---|
| 318,153 | Woodbridge | May 19, 1885 |
| 791,201 | Miller | May 30, 1905 |
| 1,308,325 | Bird | July 1, 1919 |
| 1,619,361 | Moyer | Mar. 1, 1927 |
| 1,702,160 | Hanson | Feb. 12, 1929 |
| 1,855,668 | Frayer | Apr. 26, 1932 |
| 2,436,527 | Polk et al. | Feb. 24, 1948 |
| 2,517,364 | Torresen | Aug. 1, 1950 |
| 2,678,825 | Reinischissel | May 18, 1954 |

FOREIGN PATENTS

| | | |
|---|---|---|
| 478,240 | Great Britain | Jan. 11, 1938 |